United States Patent
Branch et al.

(10) Patent No.: US 8,990,904 B2
(45) Date of Patent: *Mar. 24, 2015

(54) WEB-BASED SECURITY PROXY FOR COMPUTING SYSTEM ENVIRONMENT SCANNING

(75) Inventors: Joel W. Branch, Hamden, CT (US); Michael E. Nidd, Zurich (CH); Ruediger Rissmann, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,865

(22) Filed: Jun. 29, 2012

(65) Prior Publication Data

US 2014/0007204 A1    Jan. 2, 2014

Related U.S. Application Data

(63) Continuation of application No. 13/534,065, filed on Jun. 27, 2012.

(51) Int. Cl.
*G06F 21/00* (2013.01)
*H04L 12/24* (2006.01)

(52) U.S. Cl.
CPC ....... *H04L 41/0853* (2013.01); *Y10S 707/9994* (2013.01)
USPC .............. 726/5; 726/1; 726/7; 726/27; 726/4; 726/12; 709/219; 709/220; 709/224; 709/225; 709/204; 705/347; 705/64; 715/760; 715/740; 707/999.01; 707/E17.117; 707/602; 707/E17.005

(58) Field of Classification Search
CPC . H04L 41/0213; H04L 41/0893; H04L 63/00; H04L 67/10; H04L 41/28; H04L 41/0853; H04L 63/0884; H04L 63/101; H04L 63/168
See application file for complete search history.

(56) References Cited

U.S. PATENT DOCUMENTS 6,108,686 A * 8/2000 Williams, Jr. .................. 709/202
7,478,434 B1 * 1/2009 Hinton et al. .................... 726/27
(Continued)

OTHER PUBLICATIONS

S.S. Lin et al., Embedded Approach for Device Inventory Collection Utilizing OS Programmability, 2011 International Symposium on Integrated Network Management 745-759 (May 2011).*

(Continued)

*Primary Examiner* — Morshed Mehedi
*Assistant Examiner* — Sharon Lynch
(74) *Attorney, Agent, or Firm* — Stephen J. Walder, Jr.; Louis J. Percello

(57) ABSTRACT

Mechanisms are provided for collecting configuration data from components of a managed computing system environment. A portion of code is obtained, in a data processing system, from a data collection system that does not have security credentials to allow the data collection system to directly access to the managed computing system environment. The portion of code is executed by the data processing system using security credentials maintained in the data processing system. Executing the portion of code causes the data processing system to access the managed computing system environment and collect configuration data from the managed computing system environment. The data processing system, via the portion of code, provides the configuration data collected from the managed computing system to the data collection system which stores the collected configuration data in a data storage.

18 Claims, 3 Drawing Sheets

(56) References Cited

U.S. PATENT DOCUMENTS

| | | | |
|---|---|---|---|
| 8,037,289 B1* | 10/2011 | Karnik et al. | 713/1 |
| 8,166,455 B2* | 4/2012 | Voss | 717/106 |
| 8,275,900 B2* | 9/2012 | Meenan et al. | 709/232 |
| 2004/0088174 A1* | 5/2004 | Agrawal et al. | 705/1 |
| 2005/0060390 A1* | 3/2005 | Vakil et al. | 709/220 |
| 2005/0216421 A1* | 9/2005 | Barry et al. | 705/64 |
| 2006/0056317 A1* | 3/2006 | Manning et al. | 370/254 |
| 2008/0209031 A1* | 8/2008 | Zhu et al. | 709/224 |
| 2008/0250028 A1* | 10/2008 | Rutherglen et al. | 707/10 |
| 2009/0007054 A1* | 1/2009 | Voss | 717/101 |
| 2009/0164495 A1* | 6/2009 | MacLeod et al. | 707/102 |
| 2009/0307236 A1* | 12/2009 | Kramer et al. | 707/100 |
| 2010/0017536 A1* | 1/2010 | Colvig et al. | 709/238 |
| 2010/0192212 A1* | 7/2010 | Raleigh | 726/7 |
| 2010/0257584 A1* | 10/2010 | Meenan et al. | 726/1 |
| 2010/0319060 A1* | 12/2010 | Aiken et al. | 726/7 |
| 2011/0078108 A1* | 3/2011 | Kumar | 707/602 |
| 2011/0187511 A1* | 8/2011 | Boldyrev et al. | 340/10.51 |
| 2011/0282852 A1* | 11/2011 | Rutherglen et al. | 707/705 |
| 2012/0102543 A1* | 4/2012 | Kohli et al. | 726/1 |
| 2012/0246297 A1* | 9/2012 | Shanker et al. | 709/224 |
| 2012/0290555 A1* | 11/2012 | Wu et al. | 707/707 |
| 2012/0317239 A1* | 12/2012 | Mulder et al. | 709/219 |
| 2013/0007871 A1* | 1/2013 | Meenan et al. | 726/12 |
| 2013/0055369 A1* | 2/2013 | Kumar et al. | 726/7 |
| 2013/0067358 A1* | 3/2013 | Lalmalani et al. | 715/760 |
| 2013/0080636 A1* | 3/2013 | Friedman et al. | 709/225 |
| 2013/0198612 A1* | 8/2013 | Ceze et al. | 715/235 |
| 2013/0227424 A1* | 8/2013 | Hall et al. | 715/740 |
| 2013/0246523 A1* | 9/2013 | Gokhale | 709/204 |
| 2013/0247149 A1* | 9/2013 | Sanft et al. | 726/4 |

OTHER PUBLICATIONS

U.S. Appl. No. 13/534,065.
"Securing Simple Network Management Protocol", Cisco Systems, Inc., Cisco best-practices technical note, Document ID 20370, May 10, 2006, 8 pages.

* cited by examiner

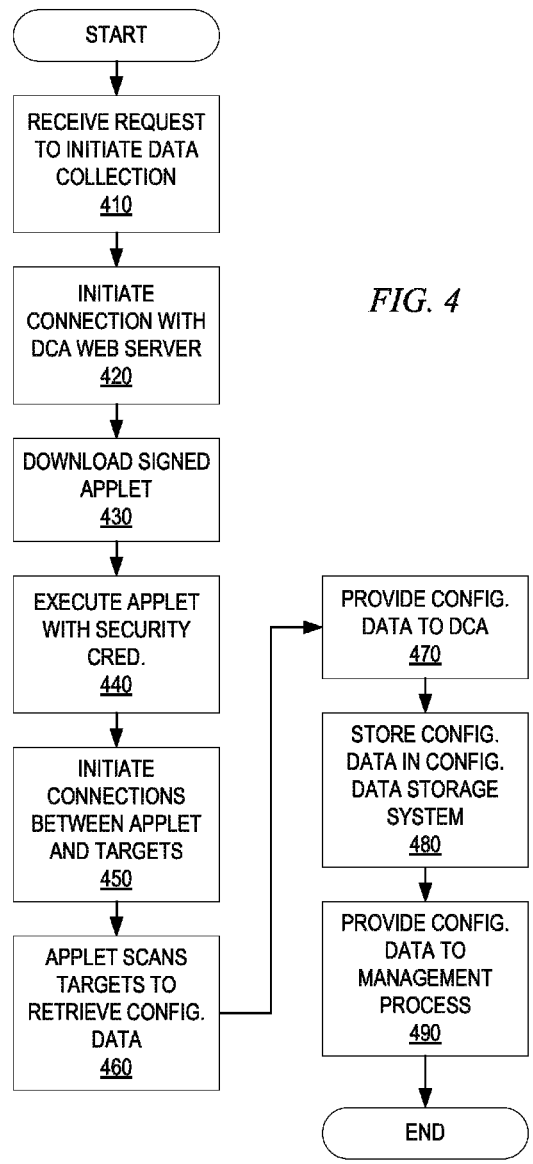

WEB-BASED SECURITY PROXY FOR COMPUTING SYSTEM ENVIRONMENT SCANNING

BACKGROUND

The present application relates generally to an improved data processing apparatus and method and more specifically to mechanisms for enabling web-based security proxies for computing system environment scanning.

In computing system environments, it is often necessary to collect configuration data for various components and resources, both hardware and software, of the computing system environments. One useful tool in collecting such configuration data is Simple Network Management Protocol (SNMP). Simple Network Management Protocol (SNMP) is an Internet-standard protocol for managing devices on Internet Protocol (IP) networks. Devices that typically support SNMP include routers, switches, servers, workstations, printers, modem racks, and more. SNMP is used mostly in network management systems to monitor network-attached devices for conditions that warrant administrative attention. SNMP is a component of the Internet Protocol Suite as defined by the Internet Engineering Task Force (IETF) and consists of a set of standards for network management, including an application layer protocol, a database schema, and a set of data objects.

SNMP exposes management data in the form of variables on the managed systems, which describe the system configuration. These variables can then be queried (and sometimes set) by managing applications.

In typical SNMP uses, one or more administrative computers, called managers, have the task of monitoring or managing a group of hosts or devices on a computer network. Each managed system executes, at all times, a software component, called an SNMP agent, which reports information via SNMP to the manager. Essentially, SNMP agents expose management data on the managed systems as variables. The protocol also permits active management tasks, such as modifying and applying a new configuration through remote modification of these variables. The variables, accessible via SNMP, are organized in hierarchies. These hierarchies, and other metadata (such as type and description of the variable), are described by Management Information Bases (MIBs).

Normal security precautions used in SNMP are to require a user identifier (ID) and password to access secured computing system components and resources and to use a white-list of IP addresses from which queries are accepted. In some instances, the user ID and password are replaced by a single community string that fills the same role as the user ID and password.

Occasionally, such as in preparation for a data center relocation, one needs to make a complete inventory of all components and resources of the computing system environment, e.g., the data center. Moreover, in some situations, while the computing system environment may be owned by one entity, the management of the computing system environment may be handled by a separate organization. As a result, access to the computing system environment's components and resources may not be readily available or easy to arrange. Moreover, the bureaucratic overhead associated with obtaining the access information, e.g., community string, user ID and password, and authorization of the source (IP whitelist), for all of the components and resources of the computing system environment is very high. This can be troublesome when quick action or determinations need to be made with regard to the configurations of such computing system environments.

SUMMARY

In one illustrative embodiment, a method, in a data processing system, is provided for collecting configuration data from components of a managed computing system environment. The method comprises obtaining, by the data processing system, a portion of code from a data collection system that does not have security credentials to allow the data collection system to directly access to the managed computing system environment. The method further comprises executing the portion of code in the data processing system using security credentials maintained in the data processing system. Executing the portion of code causes the data processing system to access the managed computing system environment and collect configuration data from the managed computing system environment. Furthermore, the method comprises providing, by the data processing system via the portion of code, the configuration data collected from the managed computing system to the data collection system which stores the collected configuration data in a data storage system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a flowchart outlining an example operation of a data collection proxy mechanism in accordance with one illustrative embodiment.

DETAILED DESCRIPTION

Figure 1:
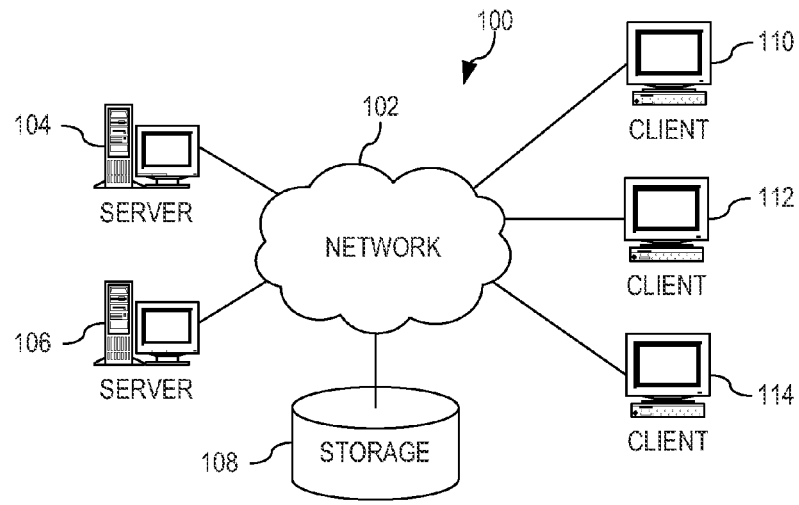
FIG. 1 is an example diagram of a distributed data processing system in which aspects of the illustrative embodiments may be implemented.

The illustrative embodiments provide mechanisms for enabling web-based security proxies for computing system environment scanning and configuration information collection. For example, the illustrative embodiments provide a web-based mechanism for accessing components and resources of a data center in order to scan these components and resources for configuration information.

The illustrative embodiments take advantage of the observation that local administrators of a computing system environment typically have access from their management consoles, e.g., SNMP administrator computing devices, which typically have a network browser application installed. The illustrative embodiments allow a system administrator, or other authorized automated tool, to utilize the browser of the management console to initiate a scan via a browser enabled signed applet without installing any new software on the management console. Since the scan is initiated from the management console, it is being performed by an authorized entity without breaching the security mechanisms of the computing system environment. After the scan is complete, the administrator can view the results, or the automated tool may process the results, and submit them to a data collection appliance (DCA) without ever granting the DCA access to the component or resource, e.g., target host device, that was scanned.

It should be noted that one of the benefits of the illustrative embodiments is that there is no requirement to install any new software in the management console computing system or the target components/resources to enable the scanning of the illustrative embodiments. This protects the security of the management console computing system and the computing system environment being scanned. To the contrary, with the illustrative embodiments, the runtime environment for performing the scanning is entirely contained in the browser virtual machine, e.g., Java Virtual Machine (JVM).

In addition, the security credentials for the target components/resources are never sent to a third party system or otherwise transmitted from the management console computing device to any other computing system other than the target components/resources being scanned. As a result, the only entities having access to the security credentials, e.g., user ID and password or community string, is the authorized management console and the target components/resources themselves. Furthermore, with the use of whitelists, additional security is provided so that the target components/resources will not respond to requests for information from computing devices whose addresses or other identities are not listed in the whitelist (the authorized management console computing device should be listed in the whitelist).

While other mechanisms may be used to achieve a similar purpose, such as described in U.S. Patent Application Serial No. 2010/0319,060, entitled "A Process and system for Comprehensive IT Discovery without Credentials," such other mechanisms require that new software be downloaded and installed on the management computing system in order to enable such scanning and results to be provided to the DCA. Other mechanisms may require that the security credentials for the target components/resources be provided to third party computing systems thereby creating a potential security concern.

With the mechanisms of the illustrative embodiments, a signed applet is provided that is accessible via a management console whereby the signed applet is given one or more target component/resource addresses and corresponding access credentials. That is, a system administrator or other authorized user may initiate a connection with a data collection appliance (DCA) via the system administrator's browser enabled management console and a management console computing system. Alternatively, an automated mechanism may initiate this connection. Via this connection, the signed applet may be downloaded from the DCA to the browser of the management console computing system which executes the applet within the browser environment, i.e. without installation of the software on the management console computing system.

The signed applet, being executed within the browser enabled management console computing system, initiates a connection to the management port of the one or more target components/resources identified. The identification of the one or more target components/resources may be performed in a manual manner by an authorized user providing the identifiers via the management console. Alternatively, a more automated approach may be used by providing a check-list file or the like that identifies the particular target components/resources to be scanned along with their corresponding access credentials. This listing may be updated dynamically as target components/resources are successfully accessed through the mechanisms of the illustrative embodiments, or in the case of an inability to access the target components/resources, an indication of an error condition may be provided in the listing.

The signed applet may then collect the required configuration information from the one or more target components/resources based on the identification of these target components/resources and providing of the access credentials. This information may be presented to an authorized user, such as a system administrator or the like, for verification that the user wishes to provide the collected configuration information to the data collection appliance (DCA). Alternatively, the providing of the configuration information to the DCA may be performed automatically without human intervention using the signed applet. The DCA may then store the configuration information into its configuration database and one or more management mechanisms may be used to process the configuration information stored in the configuration database to facilitate one or more operations being performed based on the configuration information, e.g., performing one or more operations for facilitating a relocation of a data center or the like.

As mentioned above the applet of the illustrative embodiments is a signed application. The signed applet is digitally signed using a signature that may include certificates of authenticity (or may be "self-signed"). Because the applet opens an IP socket on the machine that is running the browser software, the applet requires elevated permissions. When the browser starts a signed applet, the user is presented with the certificate chain and asked whether it represents the signature of a trusted party. If the operator then grants that permission, the virtual machine runs the applet in a different security mode that usually allows more freedom when using IP sockets. If an applet is not signed, the browser will not offer the user the option of granting elevated permission to the applet.

The use of a signed applet is not required by the mechanisms of the illustrative embodiments, but simply provides greater security. In other illustrative embodiments, an unsigned applet may be utilized. In some illustrative embodiments, the browser environment, such as a virtual machine provided as part of the browser environment, may be configured at installation to allow unsigned applets to have full access to IP sockets. For purposes of the following description, however, it will be assumed that the applet is a signed applet in order to provide additional security.

The mechanisms and operations of the illustrative embodiments as outlined above will be described in greater detail hereafter with reference to the accompanying figures. As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
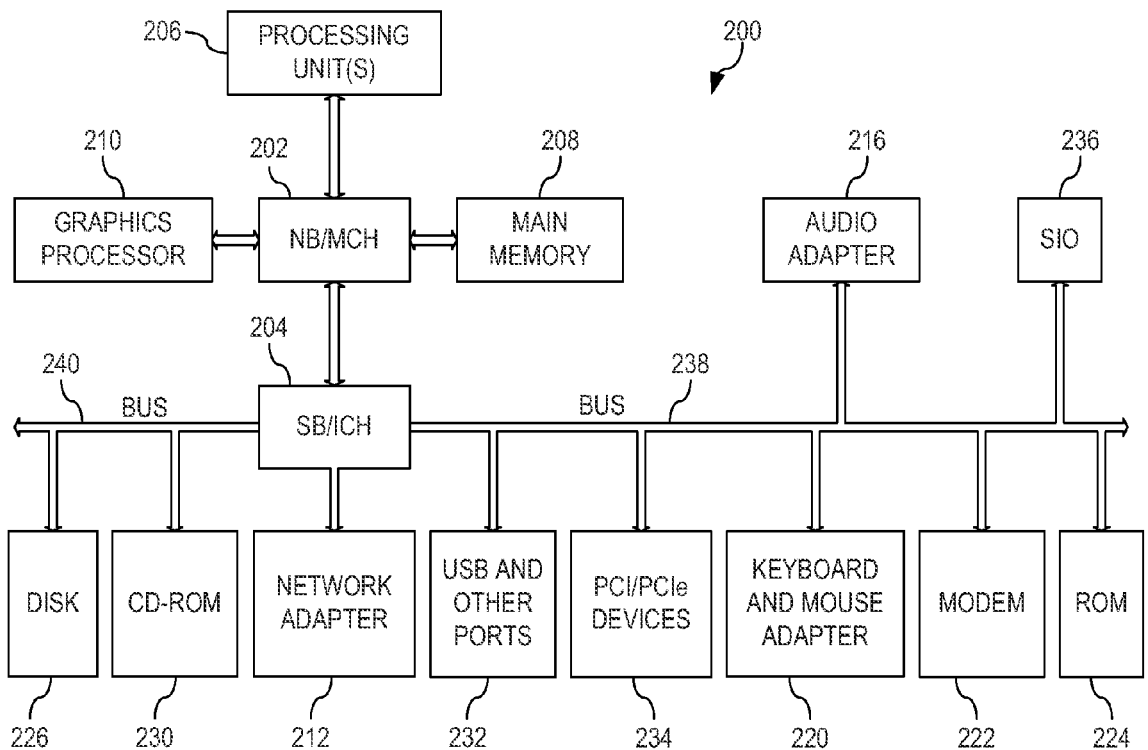
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SWICH 204. Audio adapter 216, keyboard and mouse adapter 220, modern 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Referring again to FIG. 1, with the illustrative embodiments, one or more of the components attached to the network 102, the software installed on one or more of these components, or the like, may be a computing system environment that is to be managed using the mechanisms of the illustrative embodiments. For example, the server 104, storage system 108, and/or other computing devices not explicitly shown in FIG. 1, may provide a data center or other computing system environment upon which or with which a management operation is to be performed. Another computing system, such as server 106, may provide a data collection appliance (DCA) which operates to collect configuration data from the computing system environment being managed so as to facilitate the management operation that is to be performed. For example, if the data center or computing system environment is to be migrated from one place to another, e.g., the data and software on server 104, storage system 108, and other computing devices comprising the computing system environment is to be migrated to another computing system environment or set of computing devices, then it is important to first obtain the configuration data for the current computing devices, e.g., server 106, storage system 108, and the like, so that this configuration can be replicated at the destination computing system environment.

The DCA on server 106 may be configured to collect data from the computing system environment using SNMP or the like. While configured to collect data from the computing system environment, the DCA may not have the necessary security credentials or be listed on the whitelist associated with one or more of the components of the computing system environment and thus, may not be able to directly access the components to obtain the required configuration data that the DCA is configured to collect. Furthermore, it may be difficult for the DCA to obtain the necessary security credentials and be added to the whitelist for every component of the computing system environment being managed. As a result, the DCA on the server 106 may not be able to complete its function of data collection from the computing system environment.

The illustrative embodiments provide a mechanism to enable the DCA to perform its operation of data collection from the managed computing system environment by providing an applet executable in a browser environment of an authorized management console within the computing system environment or that has the necessary credentials to access the components of the computing system environment. The execution of the applet in the browser environment of the authorized management console allows the management console to act as a proxy for the DCA by collecting the configuration data from the components of the computing system environment and providing the configuration data to the DCA. In this way, the security of the computing system environment is maintained by keeping the security credential information within the management console and not providing the security credential information to the DCA or other third party computing device. Moreover, the overhead of adding the DCA to whitelists associated with all of the components of the computing system environment is avoided.

Figure 3:
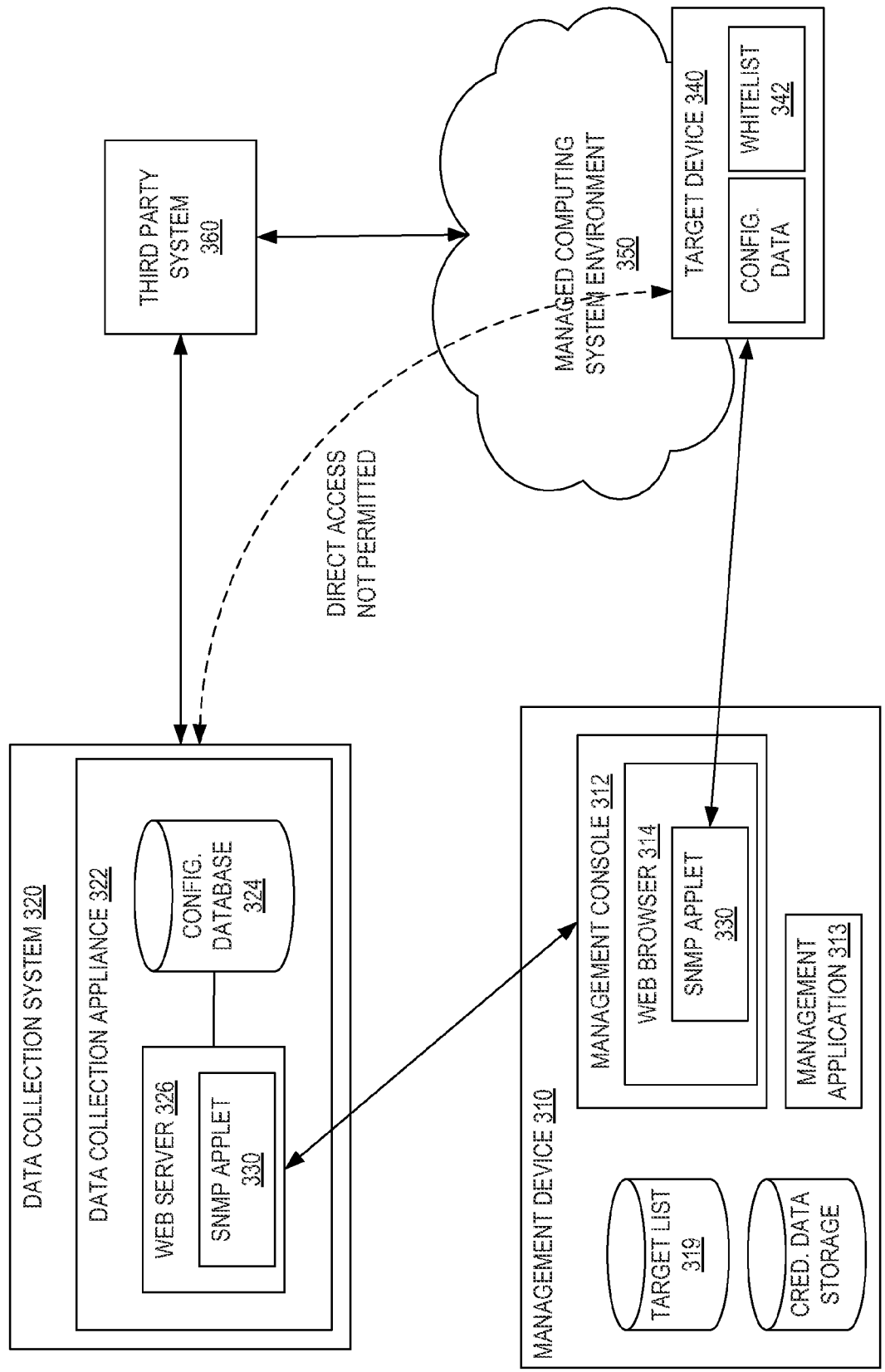
FIG. 3 is an example block diagram of the primary operational elements of a data collection proxy mechanism in accordance with one illustrative embodiment.

FIG. 3 is an example block diagram illustrating the primary operational elements of a data collection proxy system in accordance with one illustrative embodiment. Elements of FIG. 3 may be implemented in hardware, software, or any combination of hardware and software. In one illustrative embodiment, the systems and devices mentioned in FIG. 3 are implemented as hardware mechanisms with the other depicted elements comprising software instructions executed by these systems/devices and/or other hardware elements not explicitly shown. Moreover, the managed computing system environment mentioned in this description may encompass many different types of hardware and software components/resources not explicitly shown in FIG. 3, as is generally known in the art, e.g., routers, switches, computing devices, storage devices, and the like. In addition, while the following description will assume the use of SNMP as the protocol used to perform the collection of configuration data and the performance of management operations with regard to a managed computing system environment, the illustrative embodiments are not limited to such and any suitable protocol may be used without departing from the spirit and scope of the illustrative embodiments.

As shown in FIG. 3, the data collection proxy system of the illustrative embodiments involves a management computing device 310 that is configured with a management console 312. The management console 312 is configured to access security credentials for establishing SNMP connections with components/resources of the managed computing system environment 350 from the credentials data storage system 318. Furthermore, the management console 312 is configured with a browser environment 314, such as may be provided by a browser application examples of which include Microsoft Internet Explorer, Google Chrome, and the like. The browser environment 314 may have virtual machine capabilities, such as a Java Virtual machine (JVM) or other virtual machine mechanism.

In addition to the management computing device 310, the data collection proxy system includes a data collection system 320 which is configured with a data collection appliance 322 whose purpose it is to collect data from components/resources of the managed computing system environment 350. The collected data is to be later used in performing management operations with regard to the managed computing system environment 350, such as by third party system 360, for example.

As an example, it may be the case that the managed computing system environment 350 is owned by a first organization, e.g., IBM Corporation, but is managed by a second organization, e.g., ABC Corporation, based on a contractual relationship between ABC Corporation and IBM Corporation. The first organization may desire to maintain a certain level of security of the managed computing system environment 350 and as such, does not provide all of the necessary security credentials for accessing the components/resources of the managed computing system environment 350. Hence, while the second organization may provide a third party system 360 for managing certain aspects of the operation of the managed computing system environment 350, the third party system 360, and the data collection system 320 employed by the third party system 360, may not be able to directly access the components/resources of the managed computing system environment 350 to obtain the required configuration data from these components/resources to perform certain management operations, e.g., relocation, migration, or the like.

Returning to the description of the data collection system 320, the data collection appliance (DCA) 322 is configured to provide a web server 326 and store a database 324 of configuration data collected by the DCA 322. The web server 326 responds to requests from authorized management consoles for a portion of code that facilitates the DCA 322 obtaining the desired configuration data from the components/resources of the managed computing system environment 350. In the depicted example, this portion of code is a signed SNMP applet 330 provided by the web server 326.

As mentioned above, the illustrative embodiments take advantage of the observation that local administrators of a computing system environment typically have access from their management consoles, such as management console 312 to the managed computing system environment 350. The illustrative embodiments allow a system administrator 305, or other authorized automated tool, such as management application 313, to utilize the browser 314 of the management console 312 to initiate a scan of the components/resources of the managed computing system environment 350, such as target device 340, via a browser enabled signed applet 330 without installing any new software on the management console 312. Since the scan is initiated from the management console 312, it is being performed by an authorized entity, i.e. the management device 310 without breaching the security mechanisms of the managed computing system environment 350. After the scan is complete, the administrator 305 can view the results, or the automated tool 313 may process the results, and submit them to a data collection appliance (DCA) 322 without ever granting the DCA 322 access to the component/resource, e.g., target device 340, that was scanned.

With the mechanisms of the illustrative embodiments, the signed applet 330 is accessible via the management console 312 whereby the signed applet 330 is given one or more target component/resource addresses and corresponding security credentials, such as may be retrieved from the credentials data storage system 318. That is, a system administrator 305 or other authorized user may initiate a SNMP connection with a webserver 326 of the data collection appliance (DCA) 322 via the system administrator's browser 314 enabled management console 312 and the management computing device 310. Alternatively, an automated mechanism, such as management application 313, may initiate this connection with the webserver 326. Via this SNMP connection, the signed applet 330 may be downloaded from the DCA 322 to the browser 314 of the management console computing system 310 which executes the applet 330 within the browser environment 314, i.e. without installation of the software on the management console computing system 310.

The signed applet 330, being executed within the browser enabled management console computing system 310, such as within a virtual machine of a browser environment, initiates a SNMP connection to the SNMP management port of the one or more target components/resources identified, e.g., target device 340. The identification of the one or more target components/resources may be performed in a manual manner by an authorized user 305 via an interface of the browser environment 314, for example, providing the identifiers via the management console 312. Alternatively, a more automated approach may be used by providing a check-list file 319 or the like that identifies the particular target components/resources to be scanned along with their corresponding access credentials from the credentials data storage system 318. This listing 319 may be updated dynamically as target components/resources 340 are successfully accessed through the mechanisms of the illustrative embodiments, or in the case of an inability to access the target components/resources, an indication of an error condition may be provided in the listing 319 by updating, by the management console 312, the listing 319 to include an indicator of an error occurring in association with an identification of the component/resource in the listing 319.

The signed applet 330 may then collect the required configuration data from the one or more target components/resources 340 based on the identification of these target components/resources and providing of the access credentials from the access credentials data storage system 318. It should be appreciated that since the management device 310 is already configured to manage the components/resources of the managed computing system environment 350, and may in fact be part of the managed computing system environment 350, its identity is already present in the whitelist data storage 342 associated with the components/resources of the managed computing system environment 350, such as target device 340. That is, the components/resources are configured to enable SNMP management of the components/resources and, as a result, if a whitelist mechanism is implemented, the identity of the authorized management devices 310 that are used to manage these components/resources is already present in the whitelists associated with these components/resources.

The configuration data obtained by the execution of the applet 330 in the browser environment 314 of the management console 312 of the management device 310 may be presented to an authorized user 305, such as a system administrator or the like, for verification that the user wishes to provide the collected configuration data to the data collection appliance (DCA) 322. That is, the management console 312 may present one or more user interfaces through which the authorized user 305 may be presented the results of the configuration data collection performed by the applet 330. Alternatively, the providing of the configuration data to the DCA 322 may be performed automatically without human intervention using the signed applet 330 via the SNMP connection between the management console 312 and the DCA 322. The DCA 322 may then store the configuration data into its configuration database 324.

One or more management mechanisms may be used to process the configuration information stored in the configuration database 324 to facilitate one or more operations being performed based on the configuration information, e.g., performing one or more operations for facilitating a relocation of a data center or the like, such as from one computing system environment to another. These one or more management mechanisms may be implemented, for example, in the third party system 360, for example.

Thus, with the mechanisms of the illustrative embodiments, the DCA 322 is able to obtain the configuration data of the components/resources, e.g., target devices 340, of a managed computing system environment 350 without having direct access to these components/resources and without having the security credentials to access such components/resources. Furthermore, the collection of such configuration data is facilitated without the requirement to install any new software in the management console computing system or the target components/resources to enable the scanning of the target components/resources. This protects the security of the management console computing system and the computing system environment being scanned.

As described above, the illustrative embodiments involve the use of an applet 330 in a browser environment, such as virtual machine, to enable the functionality of the illustrative embodiments. The applet 330 itself, in accordance with one illustrative embodiment, may generally be represented as the following set of operations:

(1) Obtain target address (e.g., by having a user input a name of the target component/resource that is resolved by a Domain Name System (DNS), receiving a user input of an IP address of the component/resource, receiving user input specifying a selection of a component/resource from a listing, or receiving an automated identification of the component/resource);

(2) Obtain credentials for the target component/resource (e.g., either a community string or id/password);

(3) Execute an SNMP Walk operation by exchanging IP packets with the target component/resource until SNMP data has been retrieved, or otherwise utilize another appropriate mechanism for collecting SNMP management information from devices;

(4) Optionally present the retrieved data for approval before proceeding; and (5) Submit the retrieved data to the DCA.

Potentially, any of these operations may be looped, e.g. select a set of IP addresses that share a single set of credentials for access, then loop through operations (3)-(5). It is not uncommon to reuse management access credentials on more than one component/resource either by manually configuring them (e.g., SNMP community string) or because passwords are verified with Lightweight Directory Access Protocol (LDAP) (a centralized service for registering and verifying identities), and thus, looping through operations (3)-(5) for several IP addresses is reasonable in such situations. In such a modified version of the applet above, the applet would involve the following operations:

(1) Obtain target address (e.g., by having a user input a name of the target component/resource that is resolved by a Domain Name System (DNS), receiving a user input of an IP address of the component/resource, receiving user input specifying a selection of a component/resource from a listing, or receiving an automated identification of the component/resource);

(2) Obtain credentials for the target component/resource (e.g., either a community string or id/password) Individual credentials may be shared by more than one target component/resource;

(3) For each target component/resource:

(3a) Execute an SNMP Walk operation by exchanging IP packets with the target component/resource until SNMP data has been retrieved; and (3b) Optionally present the retrieved data for approval before proceeding; and (4) Submit the retrieved data to the DCA.

One might also consider taking operations 3(a), 3(b) and (4) and placing them into a second loop, first retrieving all data and then offering it for review and transmitting it.

The selection list referred to in operation (1) in the above applet embodiments may be provided in a number of different ways. For example, the selection list may be provided by the DCA with known or suspected component/resource addresses, e.g., router addresses, directly by the human administrator, or automatically as a result of previous iterations or local network scan operation having been performed and components/resources having been discovered as part of this local network scan. In some illustrative embodiments, a user may enter a subnet mask (implicitly creating a range of addresses) rather than individually entering each address. Of course other methodologies and mechanisms for populating a selection list may be used without departing from the spirit and scope of the illustrative embodiments.

FIG. 4 is a flowchart outlining an example operation of a data collection proxy mechanism in accordance with one illustrative embodiment. As shown in FIG. 4, the operation starts with a request to initiate configuration data collection (step 410). As mentioned above, this request may be manually input or automatically generated by an automated mechanism.

In response to the request to initiate the configuration data collection operation, a management console, via its browser environment, initiates a connection with a data collection appliance web server (step 420). The management console requests the data collection applet to be downloaded and receives the requested data collection applet (step 430). The data collection applet is executed and provided with the identity and security credentials of the components/resources of the managed computing system environment to be scanned (step 440). The data collection applet initiates connections with the various components/resources identified using the provided security credentials via the management console (step 450). The data collection applet scans the target components/resources and retrieves the required configuration data from them via the established connections (step 460).

The collected configuration data may then be automatically provided to the data collection appliance or may be presented to a user for review and then provided to the data collection appliance in response to the user approving the providing of the configuration data to the data collection appliance (step 470). It is assumed in this example that the configuration data is provided to the data collection appliance. The data collection appliance then stores the configuration data in a configuration data storage system (step 480) and may later provide the configuration data to one or more processes for managing the managed computer system environment (step 490), such as performing a relocation or migration operation, for example. The operation then terminates.

Thus, the illustrative embodiments provide mechanisms for enabling web-based security proxies for computing system environment scanning. The illustrative embodiments provide a mechanism for allowing a data collection appliance to collect configuration data without having a direct communication connection with the components/resources from which the configuration data is being collected and without having direct access to the security credentials for these components/resources. Furthermore, all of this is done without requiring the installation of new software in the managed computing system environment but rather using a browser environment to execute a portion of code within a virtual machine environment. Thus, the mechanisms of the illustrative embodiments provide a distinct improvement over known mechanisms that require additional software to be installed on the managed components/resources and/or exporting of security credentials outside of the managed environment or authorized management systems.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for collecting configuration data from components of a managed computing system, comprising:
    obtaining, by the data processing system, a portion of code from a data collection system, wherein the data collection system does not have security credentials to allow the data collection system to directly access a managed computing system, distinct from the data processing system, and wherein the data collection system does not receive configuration data directly from the managed computing system;
    executing the portion of code in the data processing system using security credentials maintained in the data processing system, where executing the portion of code causes the data processing system to automatically access the managed computing system using the security credentials, and collect configuration data from the managed computing system; and
    providing, by the data processing system via the portion of code, the configuration data collected from the managed computing system to the data collection system which stores the collected configuration data in a data storage, wherein:
    the portion of code is an applet and wherein the applet is executed in a browser environment on the data processing system without installing the portion of code on the data processing system,
    the managed computing system responds to requests in accordance with an established white list data structure specifying identities of devices to which the managed computing system may respond in response to requests for configuration information, and
    the data collection system is not listed in the white list data structure but the data processing system is listed in the white list data structure.

2. The method of claim 1, wherein the applet is downloaded from the data collection system in response to either a user input initiating the download of the applet or an automated mechanism initiating the download of the applet.

3. The method of claim 1, further comprising:
    performing at least one management operation on the managed computing system environment based on the collected configuration data stored in the data storage of the data collection system.

4. The method of claim 3, wherein the at least one management operation comprises one or more operations for facilitating a relocation of the data center to another computing system environment.

5. The method of claim 1, wherein the portion of code is executed in a virtual machine executing on the data processing system without installing the portion of code on the data processing system.

6. The method of claim 1, wherein the security credentials are not transmitted to any other computing device other than the managed computing system environment.

7. The method of claim 1, further comprising:
    identifying one or more target components of the managed computing system from which to obtain configuration data, wherein the portion of code is executed to collect configuration data from the identified one or more target components of the managed computing system.

8. The method of claim 7, wherein the one or more target components are identified automatically using a check list data structure specifying an identity of one the one or more target components and corresponding security credential information for the one or more target components.

9. The method of claim 8, further comprising: dynamically updating the check list data structure to include an indicator, for each target component in the one or more target components listed in the check list data structure, that indicates either a successful access of configuration information for the target component or the occurrence of an error condition in response to an unsuccessful attempt to access configuration information for the target component.

10. The method of claim 1, wherein the data processing system comprises a management console and wherein one or more target components of the managed computing system are configured to permit the management console to access the one or more target components via corresponding ports of the one or more target components.

11. The method of claim 10, wherein the one or more target components are configured to permit the management console to access the one or more target components via corresponding ports by including an identification of at least one of the management console or the data processing system in a whitelist data structure associated with the one or more target components.

12. The method of claim 10, wherein the one or more target components are configured to block access by the data collection system to the one or more target components.

13. The method of claim 1, wherein providing the configuration data collected from the managed computing system to the data collection system comprises:
    outputting the collected configuration data to a user of the data processing system; and
    receiving an input from the user specifying whether transmission of the collected configuration data to the data collection system is authorized or not, wherein the collected configuration data is provided to the data collection system only in response to the input from the user specifying that transmission of the collected configuration data to the data collection system is authorized.

14. The method of claim 1, further comprising:
    creating a connection, via one or more data networks, between a browser environment of the data processing system and a web server of the data collection system, wherein:
    obtaining the portion of code comprises downloading the portion of code as a signed applet from the web server of the data collection system;
    executing the portion of code in the data processing system using security credentials maintained in the data processing system comprises executing the signed applet in a virtual machine of the browser environment using security credentials stored in a data structure stored local to the data processing system; and
    providing the configuration data collected from the managed computing system to the data collection system comprises transmitting the configuration data over the secure connection between the browser environment and the web server.

15. The method of claim 14, wherein the data collection system cannot establish a connection directly with the managed computing system to collect the configuration information.

16. The method of claim 1, wherein executing the portion of code in the data processing system comprises executing the code to perform one or more operations to analyze and collect Simple Network Management Protocol (SNMP) management information.

17. The method of claim 1, wherein the data processing system, executing the computer readable instructions of the computer program product, is not part of the managed computing system and is distinct from the managed computing system.

18. The method of claim 1, wherein: the security credentials are maintained in a storage device associated with the data processing system and are retrieved from the storage device when executing the portion of code, and the obtaining, executing, and providing operations are performed automatically without user intervention.

* * * * *